US007097891B2

(12) United States Patent
Fenelon

(10) Patent No.: US 7,097,891 B2
(45) Date of Patent: Aug. 29, 2006

(54) DOOR SEAL

(76) Inventor: Mark S Fenelon, 727 Starlit Rd., Nashville, TN (US) 37205

( * ) Notice: Subject to any disclaimer, the term of this patent is extended or adjusted under 35 U.S.C. 154(b) by 162 days.

(21) Appl. No.: 10/749,159

(22) Filed: Dec. 30, 2003

(65) Prior Publication Data

US 2005/0147782 A1 Jul. 7, 2005

(51) Int. Cl.
*B32B 9/00* (2006.01)

(52) U.S. Cl. ......................... 428/40.1; 49/463; 49/464; 49/465; 49/466; 52/202; 52/208; 52/212; 160/116; 160/127; 160/181; 428/40.5; 428/41.8; 428/42.1; 428/42.2; 428/42.3; 428/43; 428/137; 428/192; 428/194

(58) Field of Classification Search ............... 428/40.1, 428/40.5, 41.8, 42.1, 42.2, 42.3, 43, 192, 428/194, 137; 52/202, 212, 208; 160/116, 160/127, 181; 49/463, 464, 465, 466
See application file for complete search history.

(56) References Cited

U.S. PATENT DOCUMENTS 2,854,070 A 9/1958 Flanigan
3,251,399 A 5/1966 Grossman
3,561,518 A 2/1971 Johnson
4,220,298 A 9/1980 Willis
4,446,579 A * 5/1984 Inamori et al. .......... 623/11.11
4,957,579 A * 9/1990 Knowlton ................... 156/248
4,971,130 A * 11/1990 Bentley ................... 160/368.1
5,031,516 A 7/1991 Jacobson
5,067,207 A 11/1991 Semons
5,259,656 A 11/1993 Carroll
5,819,474 A 10/1998 Strom
6,183,580 B1 2/2001 Harrell et al.
6,492,017 B1 12/2002 Bohm et al.
6,865,850 B1 * 3/2005 Campbell .................... 52/202
2004/0012219 A1 * 1/2004 Banks ....................... 269/39.3

OTHER PUBLICATIONS

*Zip-Door*, Curtain-Wall.com, http://www.curtain-wall.com/zip-door.htm (Jan. 17, 2006) 6 pages.

*Tarp/Tie Down—Tarp Zipper Door*, Homax Products, http://www.homaxproducts.com/products/tarptiedown/04/instructions.html (Jan. 17, 2006) 2 Pages.

*Dr. Shrink Zipper Access Door*, Mold Abatement, http://www.aramsco.com/dopage.htm?i_itemno=0900719&_mc=mo, (Jan. 17, 2006) 1 page.

*ZIP-UP Door System*, Protective Products International Inc., http://www.protectiveproducts.com/zipup.html, (Jan. 17, 2006) 2 pages).

*ZipWall Accessories*, ZipWall Products, http://www.zipwall.com/acc.html (Jan. 17, 2006) 2 pages.

*Do It Yourself.com*, http://doityourself.com/shop/polyethylenetarps.htm, (Jan. 17, 2006) 2 pages.

*Zip Up Products Incorporated*, http://www.zipup.com/, (Jan. 17, 2006) 7 pages.

* cited by examiner

*Primary Examiner*—Nasser Ahmad
(74) *Attorney, Agent, or Firm*—Harness, Dickey & Pierce, P.L.C.

(57) ABSTRACT

A partitioning device for sealingly closing an opening in a working surface is provided. The partitioning device generally includes a panel having a sealing side including a perimeter portion. An adhesive trim is disposed about the perimeter portion on the sealing side. A package trim is removably attached to the adhesive trim, such that when the package trim is removed to expose the adhesive trim the partitioning device can be sealingly adhered to a wall surface surrounding a wall opening.

7 Claims, 4 Drawing Sheets

FIG 7
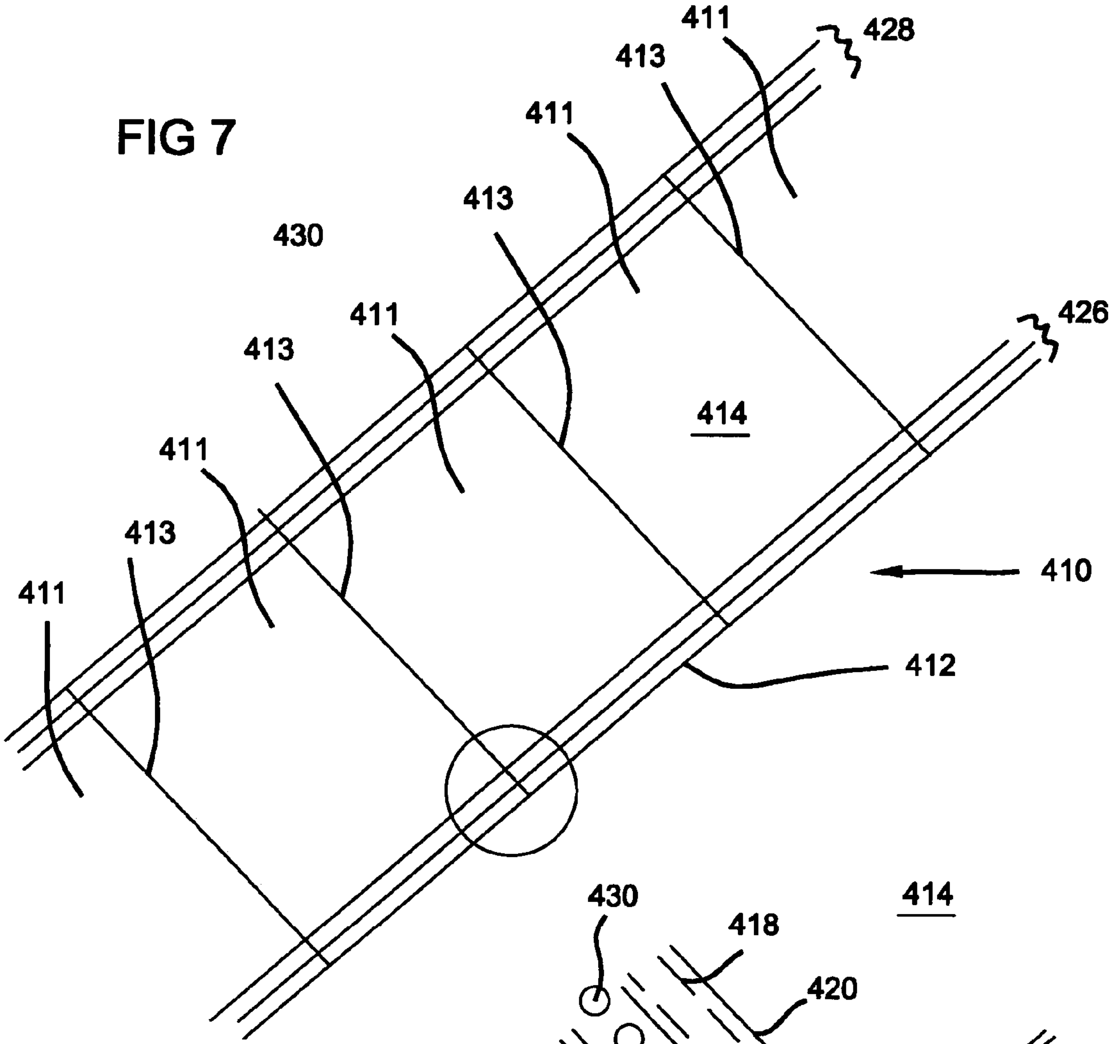
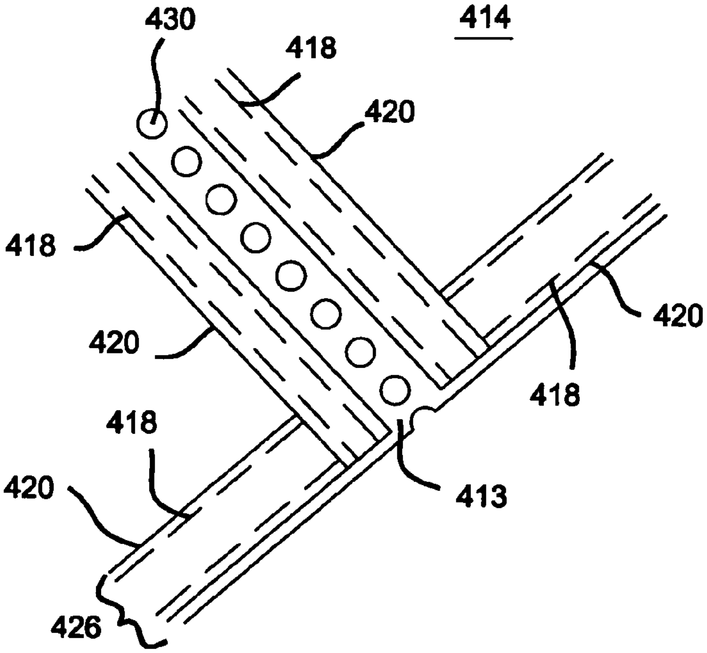
FIG 8

DOOR SEAL

FIELD OF THE INVENTION

The present invention relates to a device for sealingly closing a wall opening, and more particularly to a single, pre-sized partitioning device for sealingly closing a wall opening.

BACKGROUND OF THE INVENTION

It is common in the construction industry to seal off a construction area from other areas of the premises to prevent dust, paint fumes, noise, cold air, insects, etc. from entering the protected area. Typically, an opening, such as a door or a window, is sealed with a plastic panel. The panel is usually cut from a large roll of material to a size and shape sufficient to cover the opening. Thereafter, the panel is taped or otherwise secured at its perimeter to the wall surface adjacent the opening. While this system has generally been effective in sealing off protected areas, a job that requires a number of doors and/or windows to be sealed can become detrimentally time-consuming.

SUMMARY OF THE INVENTION

One aspect of the present invention provides a partitioning device for sealingly closing an opening in a wall surface. The partitioning device includes pre-sized or custom-sized panels having a sealing side including a perimeter portion, wherein an adhesive trim is disposed on the perimeter portion. Furthermore, the device includes a package trim attached to the adhesive trim, such that the package trim is removable to expose the adhesive trim and enable the device to be sealingly adhered to the wall surface surrounding the wall opening. A further aspect of the present invention provides a panel including a sealing wall and a working wall sealed together forming a sound dampening and insulating chamber therein. A yet further aspect of the present invention provides an opening in the panel for forcing air into the chamber, thereby inflating the panel. A yet further aspect of the present invention provides a door in the panel for passing through the partitioning device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a perspective view of a partitioning device in accordance with a fourth embodiment of the present invention; and FIG. 8 is a detail view of an intersection between a seam portion and a longitudinal edge portion of the partitioning device in accordance with the fourth embodiment of the present invention.

DETAILED DESCRIPTION OF THE PREFERRED EMBODIMENTS

The following description of the preferred embodiments is merely exemplary in nature and is in no way intended to limit the invention, its application, or its uses.

Figure 1:
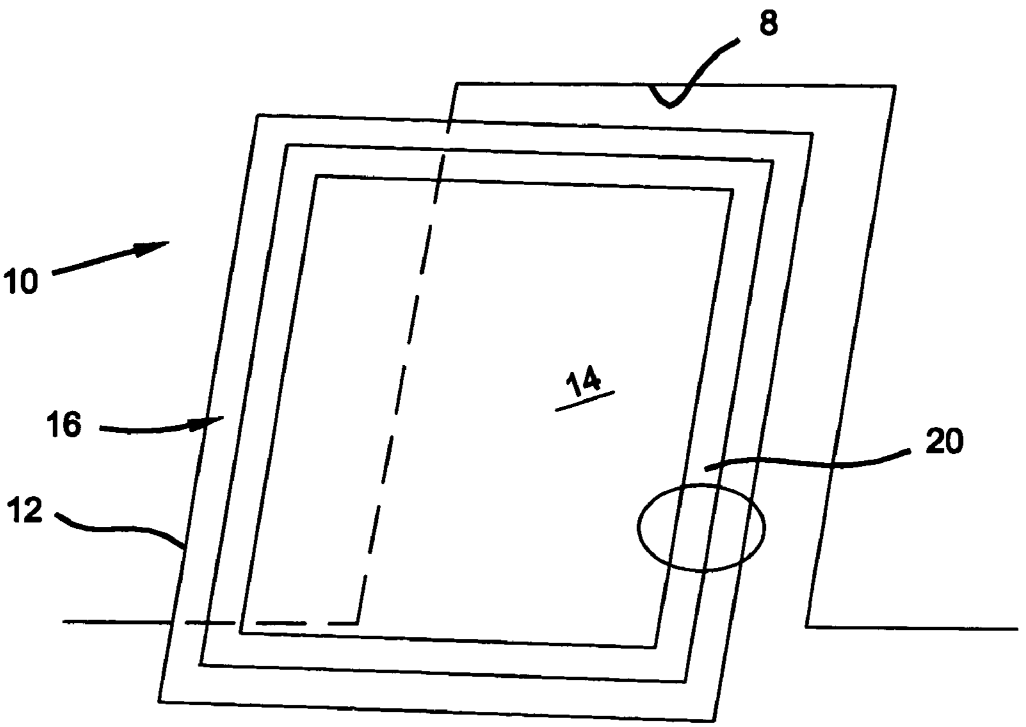
FIG. 1 is a front elevational view of a partitioning device in accordance with a first embodiment of the present invention.
Figure 2:
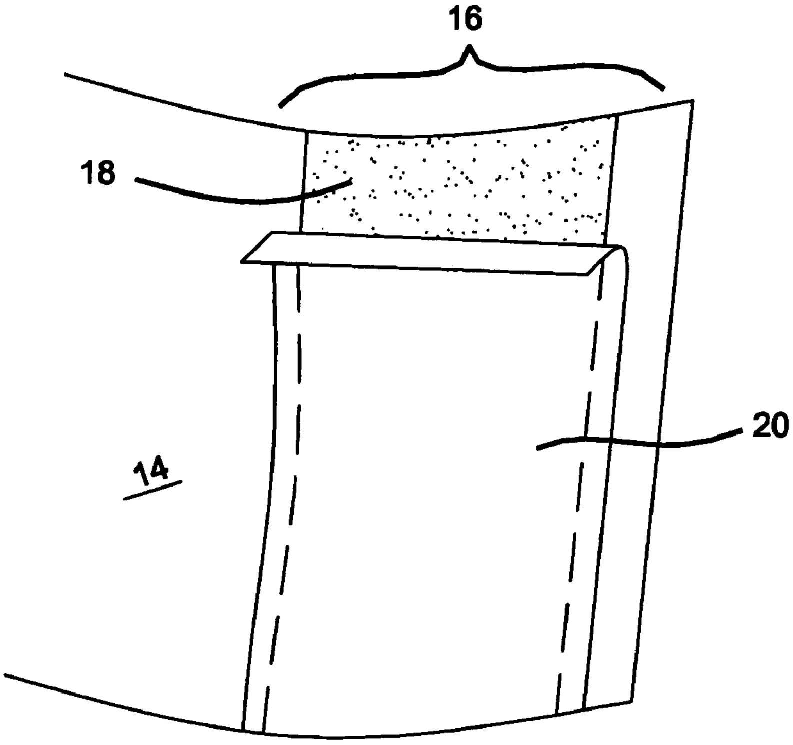
FIG. 2 is a detail view of the perimeter portion of a pre-sized partitioning device in accordance with the first embodiment of the present invention.

With reference to FIGS. 1 and 2, a first embodiment of a partitioning device 10 in accordance with the present invention is presented. The partitioning device 10 generally includes a pre-sized panel 12 having a sealing side 14 including a perimeter portion 16. The device 10 further includes an adhesive trim 18 disposed on the perimeter portion 16, as well as a package trim 20 attached to the adhesive trim 18. In a presently preferred embodiment, the adhesive trim 18 includes double-sided tape and the package trim 20 includes waxed paper. Alternatively, the adhesive trim 18 can include adhesive applied directly to the perimeter portion 16. It should be appreciated that fastening methods and adhesive methods can be used, such as hook and loop fasteners, zip lock sealing, snaps, or buttons. It should be appreciated that the partitioning device 10 of the present invention includes precut dimensions in accordance with a variety of industry-standard door and window openings 8 or can be customized for meeting specific individual needs.

During use of the partitioning device 10 of the present invention, the package trim 20 is removed from the adhesive trim 18, thereby exposing the adhesive trim 18. Thereafter, the device 10 is aligned adjacent a wall opening 8 and sealingly adhered to a wall surface surrounding the wall opening 8. In this manner, the device 10 provides for a generally airtight seal with the wall. The device 10 can be transparent to allow users to see through the covered opening.

Figure 3:
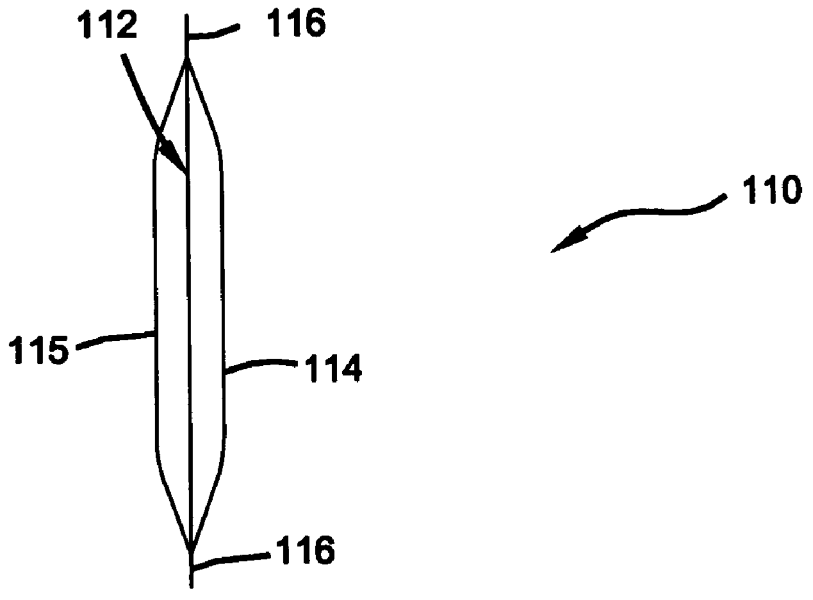
FIG. 3 is a side elevational view of a partitioning device in accordance with a second embodiment of the present invention.
Figure 4:
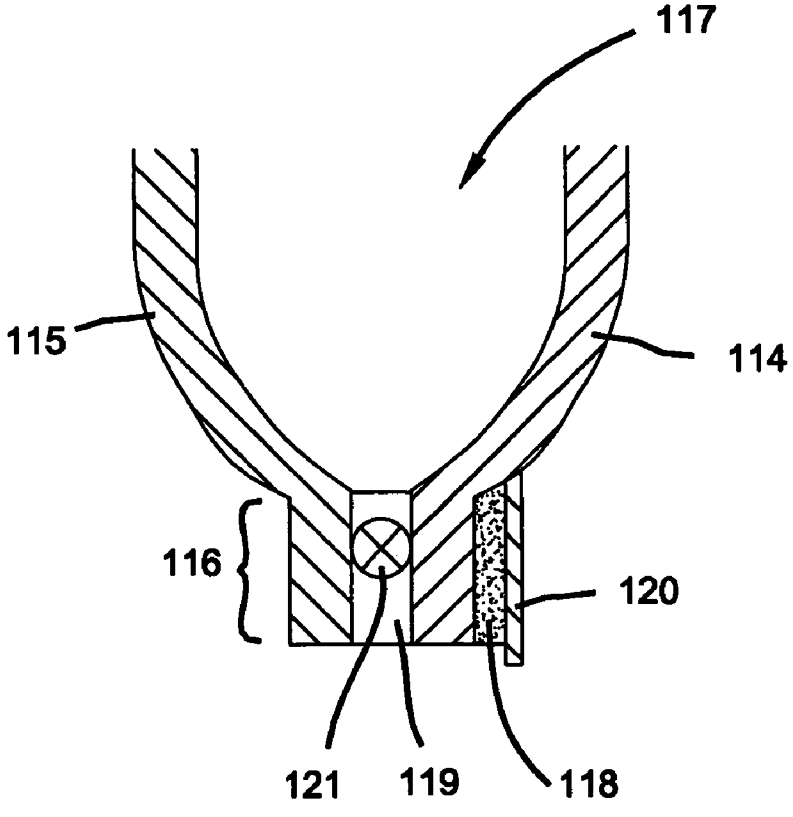
FIG. 4 is a sectional detail view of the perimeter portion of a partitioning device in accordance with the second embodiment of the present invention.

Now with reference to FIGS. 3 and 4, a second embodiment of a partitioning device 110 in accordance with the present invention is presented. The device 110 generally includes a pre-sized panel 112 having a sealing wall 114, a working wall 115, and a perimeter portion 116. The sealing wall 114 and the working wall 115 are sealed together around the perimeter portion 116 to form a chamber 117 therebetween.

The device 110 further includes an opening 119, including a valve 121, for forcing a mass into the chamber 117. In a presently preferred embodiment, the valve 121 includes a check valve for allowing a mass, such as air, into the chamber, but not out. In an alternative embodiment, the mass includes a solid insulating material, such as foam or fiberglass insulation. In either embodiment, the mass fills the panel 112 and aids in preventing heat and sound from passing through. The device 110 further includes an adhesive trim 118 disposed on the sealing wall 114 about its perimeter portion 116, as well as a package trim 120 removably attached to the adhesive trim 118.

During use of the partitioning device 110 of the second embodiment, air is forced through the valve 121 using a compressor or other similar apparatus, as is well known in the art, and into the chamber 117. In an alternate embodiment, insulating material is forced into the chamber 117. Thereafter, the package trim 120 is removed from the adhesive trim 118, thereby exposing the adhesive trim 118. The partitioning device 110 is then aligned with and sealingly adhered to a wall surface surrounding a wall opening. In this manner, the adhesive trim 118 adheres to the wall surface and provides a generally airtight seal therewith.

Figure 5:
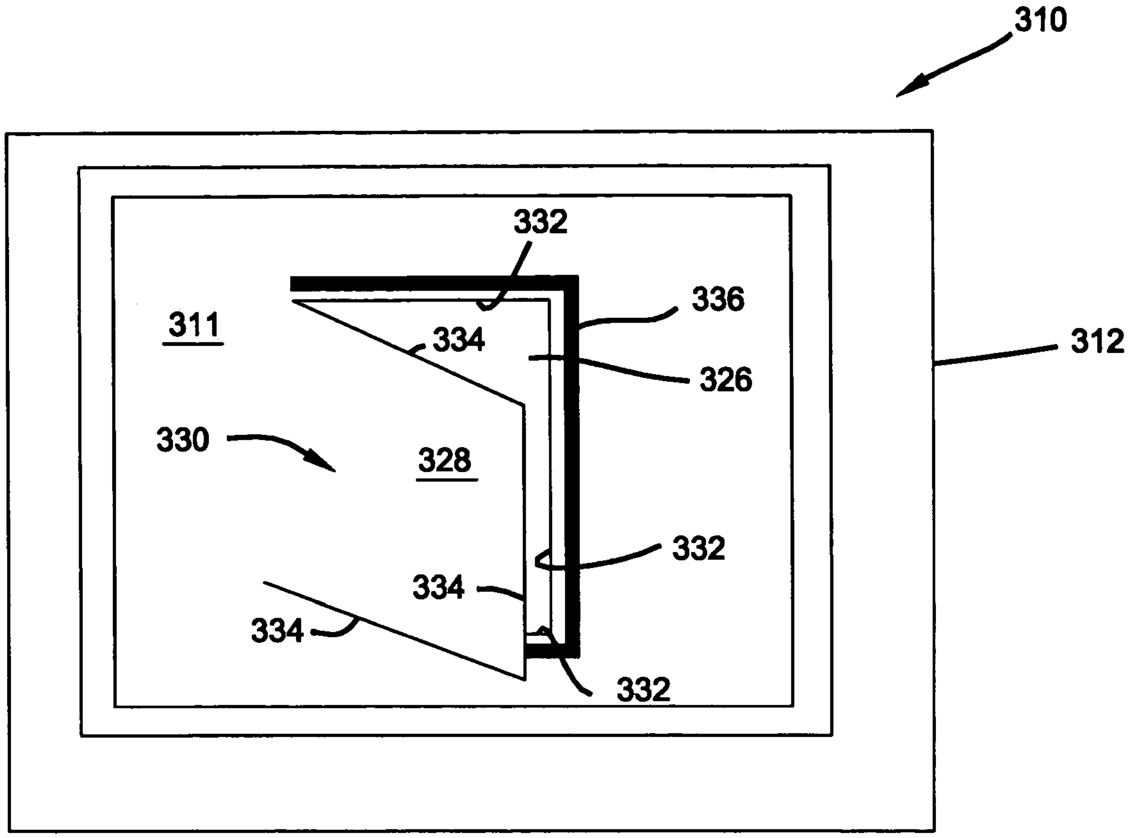
FIG. 5 is a front elevational view of a partitioning device in accordance with a third embodiment of the present invention.
Figure 6:
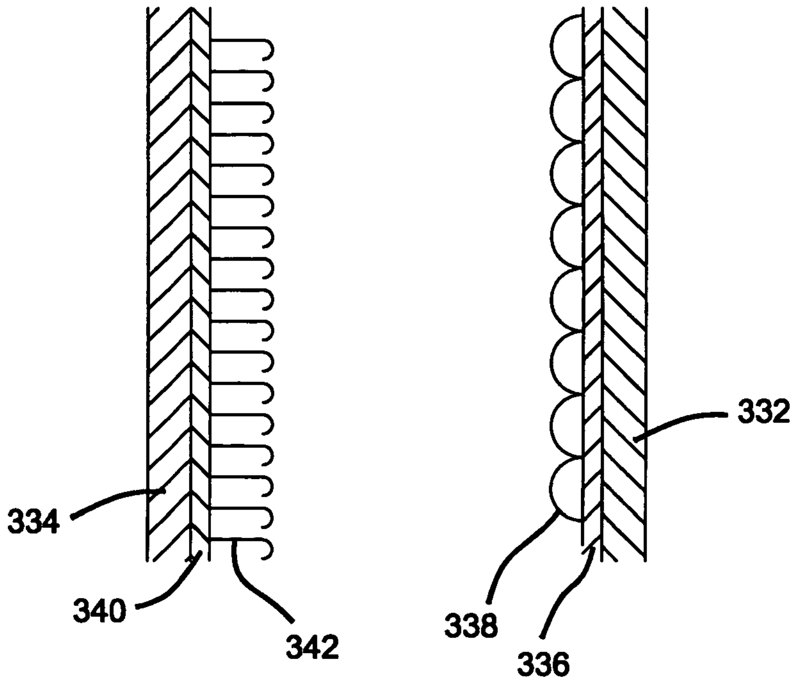
FIG. 6 is a sectional view of an opening edge and a closing edge of the partitioning device in accordance with the third embodiment of the present invention.

Now with reference to FIGS. 5 and 6, a third embodiment of a pre-sized partitioning device 310 in accordance with the present invention is presented. The device 310 generally includes a pre-sized panel 312 similar to the first embodiment described above with reference to FIGS. 1 and 2. However, the panel 312 further includes a body portion 311 having a door opening 326 and a door 328. The door 328 is pivotally attached to the body portion 311 by a hinge portion 330. In a presently preferred embodiment, the door 328 is cut out of the body portion 311, such that the hinge portion 330 includes the same material as the body portion 311. It should be appreciated that the panel including door opening 326 and door 328 could also be employed with double walled construction as described above with reference to FIGS. 3 and 4.

The door opening 326 generally includes three opening edges 332 and the door 328 generally includes three closing edges 334 adapted to selectively engage the three opening edges 332. In a presently preferred embodiment, the opening edges 332 each include a hook and loop-type connector 336 having a plurality of loop components 338 and the closing edges 334 each include a corresponding hook and loop-type connector 340 having a plurality of hook components 342, such as Velcro®. It should be understood that an adhesive connection could also be used in place of the hook and loop-type connection just described.

During use, the partitioning device 310 is adhered to a wall surface surrounding a wall opening in the same manner as that described above with reference to FIGS. 1 and 2. Subsequently, the door 328 within the body portion 311 can be opened and closed repeatedly. This is made possible by the hook components 342 of the hook and loop-type connector 340 which are adapted to repetitively engage and disengage the loop components 338 of the hook and loop-type connector 336. This enables a single partitioning device 310 to be used for a single wall opening for a longer period of time without sacrificing periodic passage through that opening. It should be understood that other fasteners, such as snaps, buttons, or zip lock-type sealing can be utilized holding the door 328 in a closed position.

Now with reference to FIGS. 7 and 8, a fourth embodiment of a partitioning device 410 in accordance with the present invention is presented. The device 410 generally includes a panel 412 having a plurality of body portions 411 separated by a plurality of seam portions 413. In a presently preferred embodiment, the seam portions 413 each include a plurality of perforations 430 for enabling each of the body portions 411 to be detached from the panel 412. The panel 412 further includes a sealing side 414 having a first longitudinal edge portion 426 and a second longitudinal edge portion 428 situated generally parallel to one another and running perpendicular to the seam portions 413. An adhesive trim 418 covered by a removable package trim 420 is disposed on the first and second longitudinal edge portions 426, 428, as well as generally adjacent to each side of the seam portions 413.

In a presently preferred embodiment, the panel 412 is stored in the form of a roll providing for compact storage and easy transportation. Therefore, during use, a portion of the panel 412 is unrolled, thereby enabling the detachment of at least one body portion 411. A body portion 411 is thereafter detached from the panel 412 by tearing along a seam portion 413. As mentioned above, the perforations 430 aid in this task. Following detachment, the package trim 420 is removed from the adhesive trim 418 and the partitioning device 410 is adhered to a wall surface surrounding a wall opening, thereby providing a generally airtight seal therewith. It should be appreciated that the body portions 411 of the panel 412 just disclosed could also incorporate double walled construction, as described with reference to FIGS. 3 and 4 above, as well as a door and door opening, as described with reference to FIGS. 5 and 6 above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A doorway or window partitioning device for sealingly closing an opening consisting of one of the doorway or window in a building, said partitioning device comprising:

a panel having a plurality of pre-sized body portions separated by a plurality of seam portions, each pre-sized body portion including a sealing side, a first longitudinal edge portion, and a second longitudinal edge portion, wherein said plurality of body portions are detachable from said panel at said plurality of seam portions, whereby said body portions are made detachable by perforations along each seam portion, the two longitudinal edge portions are perpendicular to the seam portions and are spaced apart by the body panel located therebetween, said edge portions are joined along opposite edges of the panel forming the doorway or window sealingly closing partitioning device panel;

a door opening in each of said body portions having an opening edge, a door having a closing edge for selectively engaging said opening edge, said opening edge including a first hook and loop-type connector and said closing edge including a second hook and loop-type connector adapted to selectively and repeatedly engage first hook and loop-type connector, and a hinge pivotally attaching said door;

an adhesive trim disposed on said sealing side of said panel along said first and second longitudinal edge portions and generally adjacent to each side of said plurality of seam portions; and a package trim attached to said adhesive trim, wherein said package trim is removable to enable said plurality of body portions to be sealingly adhered around the opening.

2. The partitioning device of claim 1, wherein said panel may be deployed as a roll capable of dispensing individual pre-sized body portions.

3. The partitioning device of claim 1, wherein said adhesive trim includes double-sided tape.

4. The partitioning device of claim 1, wherein said package trim includes waxed paper.

5. A doorway or window partitioning device for sealingly closing an opening consisting of one of the doorway or window in a building, said partitioning device comprising:

a pre-sized panel having a sealing side including a perimeter portion, wherein said pre-sized panel includes a sealing wall and a working wall the sealing wall is sealed along its perimeter, opposite the sealing side, to the working wall perimeter forming a chamber therebetween, wherein said pre-sized panel includes an opening with a check valve for forcing a mass of air into said chamber, said panel forming the doorway or window sealingly closing partitioning device panel;

an adhesive trim disposed on said perimeter portion of said sealing side, said pre-sized panel and said adhesive trim being sized and configured to seal the opening of the building; and a package trim attached to said adhesive trim, wherein said package trim is removable to expose said adhesive trim and enable said panel to be sealingly adhered around the opening.

6. The partitioning device of claim 5, wherein said adhesive trim includes double-sided tape.

7. The partitioning device of claim 5, wherein said package trim includes waxed paper.

* * * * *